US012566523B2

(12) United States Patent
Utsugi et al.

(10) Patent No.: US 12,566,523 B2
(45) Date of Patent: *Mar. 3, 2026

(54) POSITION DETECTION CIRCUIT, POSITION DETECTION METHOD, AND POSITION DETECTION SYSTEM

(71) Applicant: Wacom Co., Ltd., Saitama (JP)

(72) Inventors: Masafumi Utsugi, Saitama (JP); Jui Min Liu, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/806,598

(22) Filed: Aug. 15, 2024

(65) Prior Publication Data

US 2024/0402852 A1      Dec. 5, 2024

Related U.S. Application Data

(63) Continuation of application No. 18/180,054, filed on Mar. 7, 2023, now Pat. No. 12,093,487.

(30) Foreign Application Priority Data

Apr. 19, 2022    (JP) ................................. 2022-069027

(51) Int. Cl.
*G06F 3/041* (2006.01)
*G06F 3/0354* (2013.01)
*G06F 3/044* (2006.01)

(52) U.S. Cl.
CPC ...... *G06F 3/04186* (2019.05); *G06F 3/03545* (2013.01); *G06F 3/04162* (2019.05);
(Continued)

(58) Field of Classification Search
CPC ............ H10K 59/40; G06F 3/041–047; G06F 2203/041–04114; G06F 3/044;
(Continued)

(56) References Cited

U.S. PATENT DOCUMENTS

| 2008/0309630 A1* | 12/2008 | Westerman | ......... G06F 3/04883 |
| | | | 345/173 |
| 2013/0100071 A1* | 4/2013 | Wright | ................ G06F 3/04166 |
| | | | 345/173 |

(Continued)

FOREIGN PATENT DOCUMENTS

| CN | 106775084 B | * | 4/2019 | ........... G06F 3/0418 |
| JP | 2011002891 A | | 1/2011 | |
| JP | 7348967 B2 | * | 9/2023 | ......... G06F 3/04166 |

OTHER PUBLICATIONS

CN-106775084-B (Year: 2019).*
JP-7348967-B2 (Year: 2020).*

*Primary Examiner* — Sanjiv D. Patel
(74) *Attorney, Agent, or Firm* — Seed Intellectual Property Law Group LLP

(57) ABSTRACT

A position detection circuit for detecting, by using a touch sensor, a position indicated by a passive pointer to a touch surface disposed on the touch sensor. The position detection circuit includes a detection circuit that detects a touch of the passive pointer to the touch surface, a calculation circuit that calculates a total value of capacitance values in a calculation region surrounding at least part of a touch region indicating a region of the touch, and an output circuit that outputs an indicated position that is indicated by the touch, based on the total value of the capacitance values. The output circuit outputs the indicated position when the total value is equal to or less than a threshold value, and does not output the indicated position or invalidates the indicated position and outputs the indicated position that has been invalidated, when the total value exceeds the threshold value.

14 Claims, 9 Drawing Sheets

(52) U.S. Cl.
CPC .......... *G06F 3/0441* (2019.05); *G06F 3/0442*
(2019.05); *G06F 3/0446* (2019.05)

(58) Field of Classification Search
CPC .. G06F 3/04186; G06F 3/0446; G06F 3/0412;
G06F 3/03545; G06F 3/0443; G06F
3/0445
See application file for complete search history.

(56) References Cited

U.S. PATENT DOCUMENTS

2014/0104191  A1*   4/2014   Davidson ............ G06F 3/04162
                                                       345/173
2017/0205944  A1*   7/2017   Kim ................... G06V 40/1306
2019/0258337  A1*   8/2019   Liu ..................... G06F 3/04186
2019/0258352  A1*   8/2019   Liu ....................... G06F 3/0416
2022/0066614  A1*   3/2022   Shirley ................ G06F 3/0446

* cited by examiner

Figure 3:
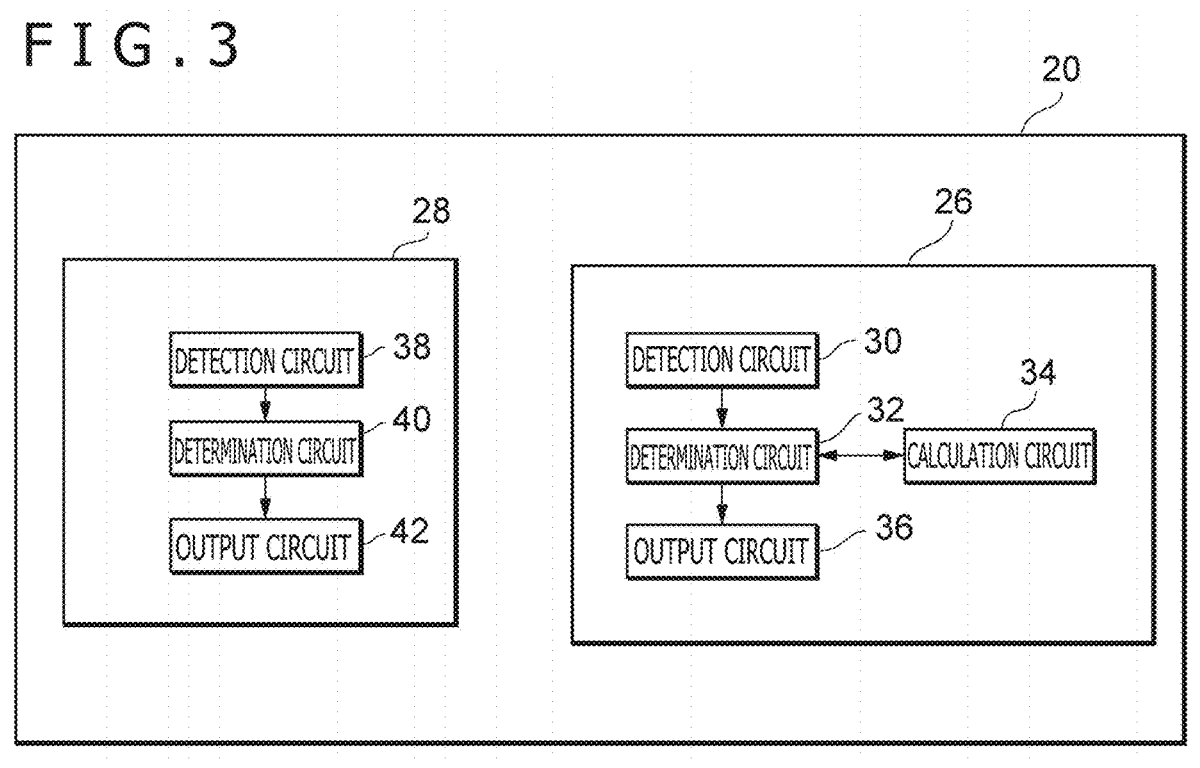

DETECTION CIRCUIT — 38

DETERMINATION CIRCUIT — 40

OUTPUT CIRCUIT — 42

DETECTION CIRCUIT — 30

34

32

DETERMINATION CIRCUIT ⟷ CALCULATION CIRCUIT

OUTPUT CIRCUIT — 36

HAND STARTS TO APPROACH

50A(100)

50B(100)

50C(100)

t

POSITION DETECTION CIRCUIT, POSITION DETECTION METHOD, AND POSITION DETECTION SYSTEM

BACKGROUND

Technical Field

The present disclosure relates to a position detection circuit, a position detection method, and a position detection system.

Description of the Related Art

In the related art, there is known a technique that detects a user's touch to a touch surface on a touch sensor. For example, Japanese Patent Laid-Open No. 2011-002891 (hereinafter, referred to as Patent Document 1) discloses a technique for invalidating an input of a touch when the area of a touch region indicating the region of the touch detected on the touch panel is equal to or greater than a predetermined area in an information processing device including a touch panel.

Incidentally, for example, assume the case where a user's hand slowly approaches the touch panel. In this case, the touch region is small at the beginning of the contact, and as the contact becomes stable, the touch region gradually becomes larger. In such a case, with the technique disclosed in Patent Document 1, when the touch region is smaller than the predetermined area at the beginning of the contact with the touch panel, the touch input is not invalidated. As a result, there has been a problem that the input of the touch that is not intended by the user is validated and ends up with the operation result that is not intended by the user.

BRIEF SUMMARY

Therefore, it is an object of the present disclosure to provide a position detection circuit, a position detection method, and a position detection system that can suppress the situation in which the operation result becomes one that is not intended by the user.

A position detection circuit according to a first aspect of the present disclosure is a position detection circuit for detecting, by using a touch sensor of a capacitance system, a position indicated by a passive pointer to a touch surface disposed on the touch sensor, the touch sensor including a plurality of sensor electrodes arranged in a planar form. The position detection circuit includes a detection circuit which, in operation, detects a touch of the passive pointer to the touch surface, a calculation circuit which, in operation, calculates a total value of capacitance values in a calculation region surrounding at least part of a touch region indicating a region of the touch detected by the detection circuit, and an output circuit which, in operation, outputs an indicated position that is indicated by the touch detected by the detection circuit, based on the total value of the capacitance values calculated by the calculation circuit, in which the output circuit, in operation, outputs the indicated position when the total value is equal to or less than a threshold value, and does not output the indicated position or invalidates the indicated position and outputs the indicated position that has been invalidated, when the total value exceeds the threshold value.

In the position detection circuit according to a second aspect of the present disclosure, the calculation circuit, in operation, calculates a total value of capacitance values in a calculation region surrounding at least part of the touch region and excluding the touch region.

In the position detection circuit according to a third aspect of the present disclosure, the calculation circuit, in operation, calculates a total value of positive capacitance values among the capacitance values in the calculation region.

In the position detection circuit according to a fourth aspect of the present disclosure, the calculation circuit in operation, calculates the total value of the capacitance values in the calculation region when a size of the touch region is within a predetermined range, and the output circuit outputs the indicated position based on the total value when the size of the touch region is within the predetermined range.

A position detection method according to a fifth aspect of the present disclosure is a position detection method for detecting, by using a touch sensor of a capacitance system, a position indicated by a passive pointer to a touch surface disposed on the touch sensor, the touch sensor including a plurality of sensor electrodes arranged in a planar form. The position detection method is performed by a position detection circuit connected to the touch sensor and includes detecting a touch of the passive pointer to the touch surface, calculating a total value of capacitance values in a calculation region surrounding at least part of a touch region indicating a region of the touch detected in the detecting, and outputting an indicated position that is indicated by the touch detected in the detecting, based on the total value of the capacitance values calculated in the calculating, in which the outputting includes outputting the indicated position when the total value is equal to or less than a threshold value, and not outputting the indicated position or invalidating the indicated position and outputting the indicated position that has been invalidated, when the total value exceeds the threshold value.

In the position detection method according to a sixth aspect of the present disclosure, the calculating includes calculating a total value of capacitance values in a calculation region surrounding at least part of the touch region and excluding the touch region.

In the position detection method according to a seventh aspect of the present disclosure, the calculating includes calculating a total value of positive capacitance values among the capacitance values in the calculation region.

In the position detection method according to an eighth aspect of the present disclosure, the calculating includes calculating the total value of the capacitance values in the calculation region when a size of the touch region is within a predetermined range, and the outputting includes outputting the indicated position based on the total value when the size of the touch region is within the predetermined range.

A position detection system according to a ninth aspect of the present disclosure is a position detection system including an electronic pen and a position detection circuit which in operation, detects, by using a touch sensor of a capacitance system, a position indicated by the electronic pen to a touch surface disposed on the touch sensor and a position indicated by a passive pointer to the touch surface, the touch sensor including a plurality of sensor electrodes arranged in a planar form, in which the position detection circuit includes a detection circuit which in operation, detects a touch of the passive pointer to the touch surface, a calculation circuit which in operation, calculates a total value of capacitance values in a calculation region surrounding at least part of a touch region indicating a region of the touch detected by the detection circuit, and an output circuit which in operation, outputs an indicated position that is indicated by the touch detected by the detection circuit, based on the total value of the capacitance values calculated by the calculation circuit, and the output circuit in operation, outputs the indicated position when the total value is equal to or less than a threshold value, and does not output the indicated position or invalidates the indicated position and outputs the indicated position that has been invalidated, when the total value exceeds the threshold value.

According to an embodiment of the present disclosure, it is possible to suppress the situation in which the operation result becomes the one that is not intended by the user.

BRIEF DESCRIPTION OF THE SEVERAL VIEWS OF THE DRAWINGS

FIG. 1 is a view illustrating an example of an overall configuration and a usage state of a position detection system according to an embodiment of the present disclosure;

FIG. 3 is a functional block diagram illustrating a functional configuration of a touch integrated circuit (IC) of the electronic device of FIG. 2;

DETAILED DESCRIPTION

Figure 2:
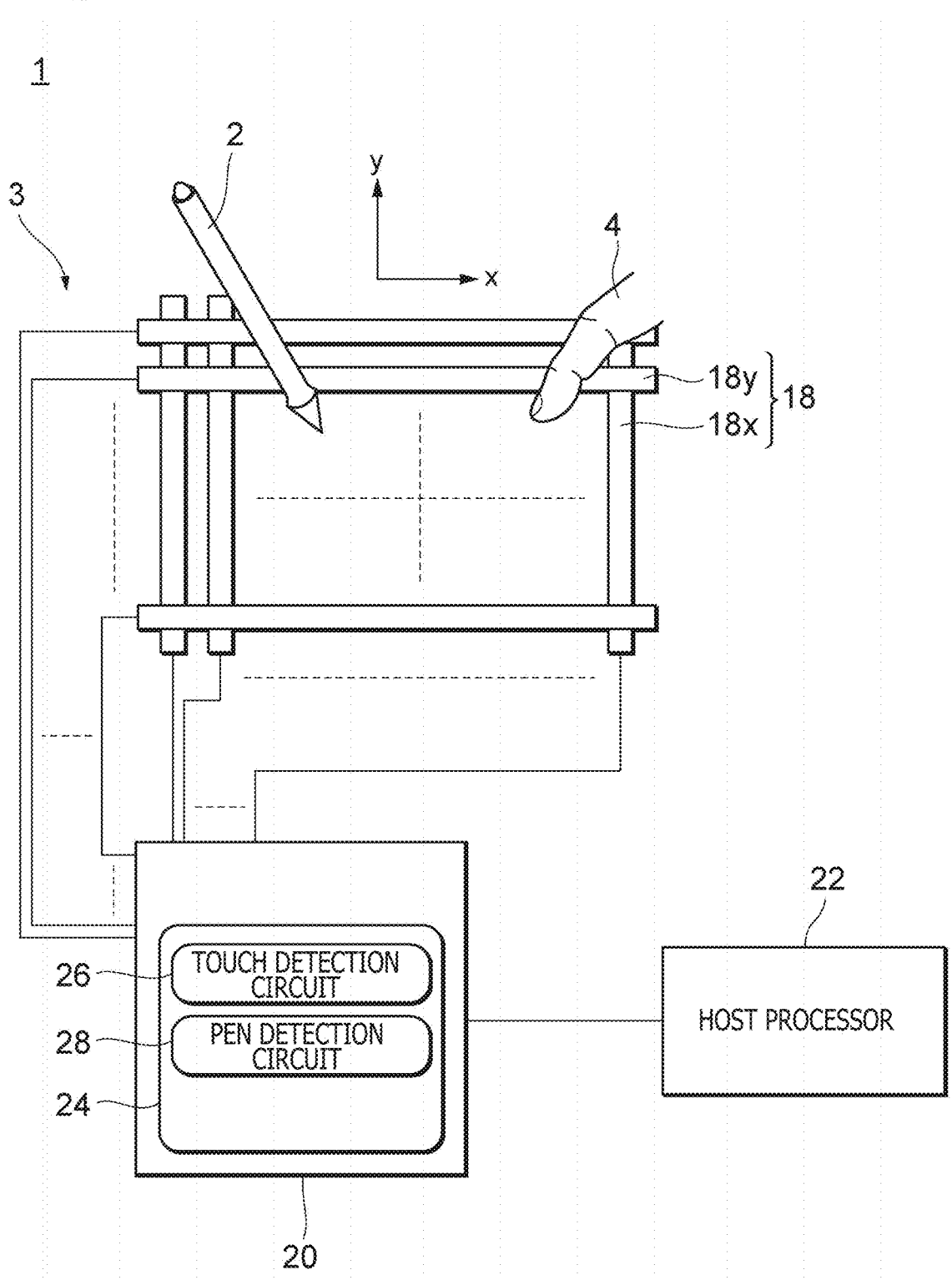
FIG. 2 is a diagram illustrating a schematic configuration of an electronic device of the position detection system of FIG. 1 according to an embodiment of the present d.

A position detection system according to an embodiment of the present disclosure (hereinafter referred to as the "the present embodiment") is described below with reference to the accompanying drawings. To facilitate understanding of the description, the same elements or elements having the same functions are denoted by the same reference signs as much as possible in each drawing, and redundant description is omitted.

Overall Configuration

Figure 1:
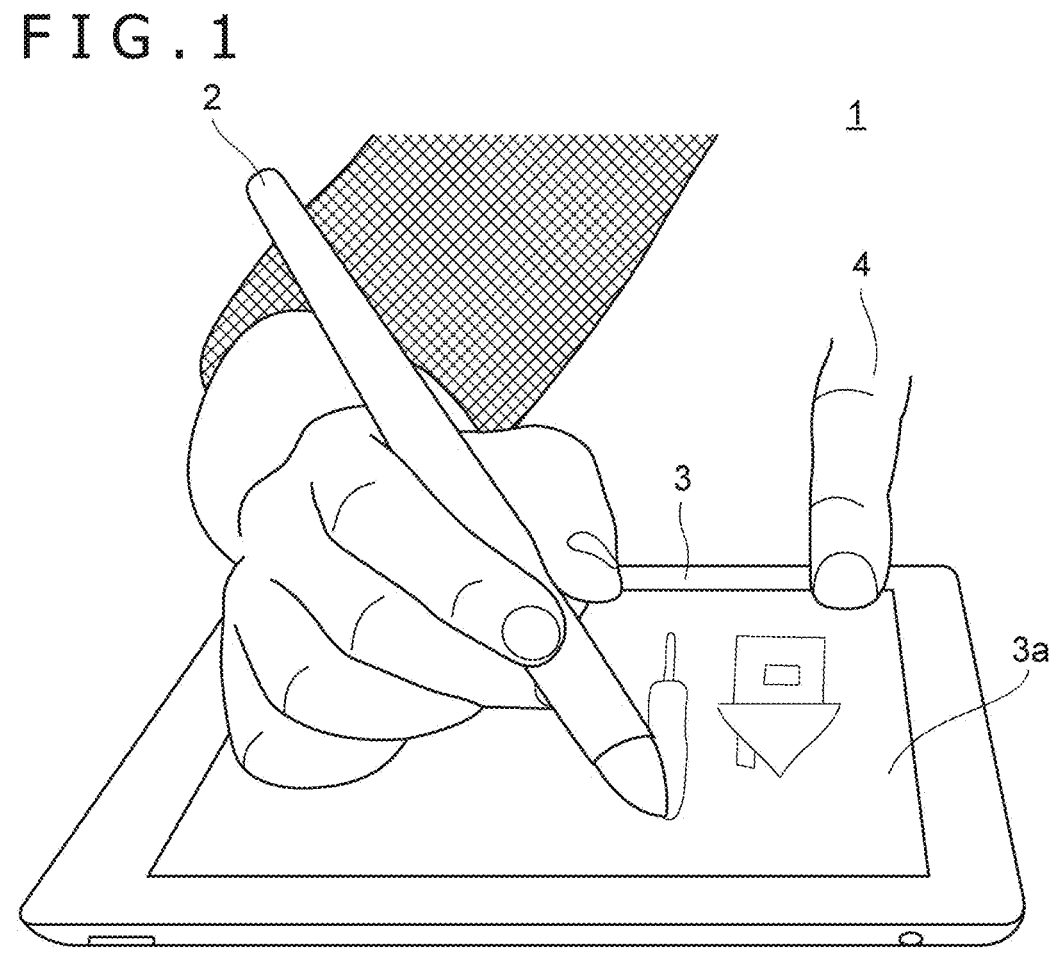

FIG. 1 is a view illustrating an example of an overall configuration and a usage state of a position detection system 1 according to the present embodiment. As illustrated in FIG. 1, the position detection system 1 according to the present embodiment includes an electronic pen 2 and an electronic device 3.

The electronic pen 2 is an electronic pen that operates by an active capacitance system and is also referred to as a "stylus." The electronic pen 2 can transmit and receive signals to and from the electronic device 3. Hereafter, a signal transmitted from the electronic device 3 to the electronic pen 2 is referred to as an uplink signal, while a signal (pen signal) transmitted from the electronic pen 2 to the electronic device 3 is referred to as a downlink signal.

A pen electrode is disposed at a tip of the electronic pen 2. The electronic pen 2 receives the uplink signal and transmits the downlink signal through the capacitance formed between the pen electrode and a touch sensor 18 (see FIG. 2), which is superimposed on a touch surface 3a of the electronic device 3. A pen electrode for receiving the uplink signal and a pen electrode for transmitting the downlink signal may be different or the same.

The electronic pen 2 includes functional units such as a pen pressure detector, a side switch state detector, a storage device, a power supply device, and a controller. The pen pressure detector is, for example, configured as a pen pressure detection unit including a variable capacitor and detects a pressure applied to a pen tip of the electronic pen 2, as a pen pressure. The side switch state detector is, for example, configured as a switch operation unit and a side switch disposed on a side surface of the electronic pen 2. The side switch state detector detects the on/off state of the side switch according to whether or not a user has operated the switch operation unit. The storage device is configured as a non-volatile memory including, for example, a semiconductor memory. The storage device stores, for example, various programs necessary for the execution of processing in the electronic pen 2 and a unique identification (ID) assigned in advance. The power supply device is, for example, configured as a battery that is a rechargeable battery including a storage battery and supplies operation power for the electronic pen 2. The controller is, for example, configured as a control circuit and controls each unit of the electronic pen 2.

The electronic device 3 is a tablet terminal including the touch surface 3a configured by a touch panel display, for example. The electronic device 3 can detect a position indicated by the electronic pen 2 to the touch surface 3a and a position indicated by a user's finger 4 as a passive pointer to the touch surface 3a. Hereinafter, the position indicated by the electronic pen 2 to the touch surface 3a is referred to as a "pen position," and the position indicated by the user's finger 4 to the touch surface 3a is referred to as a "touch position." The passive pointer does not transmit signals, for example, to the electronic pen 2, which can transmit and receive signals. The passive pointer is not limited to the finger 4 and may be an auxiliary device such as a ruler or a passive pen. Further, the electronic device 3 is not limited to a tablet terminal and may be, for example, configured as a smartphone or a personal computer.

The user can draw pictures and characters on the electronic device 3 by holding the electronic pen 2 with one hand and moving it while pressing the pen tip against the touch surface 3a of the electronic device 3. The user can also perform desired operations, including an input operation for drawing pictures and characters on the electronic device 3 and a pinch-out operation, by bringing the user's finger 4 into contact with the touch surface 3a and moving it on the touch surface 3a.

FIG. 2 is a diagram illustrating a schematic configuration of the electronic device 3 illustrated in FIG. 1. As illustrated in FIG. 2, the electronic device 3 includes the touch sensor 18, a touch IC 20, which is a position detection circuit, and a host processor 22. In FIG. 2, the touch surface 3a, which is disposed on the touch sensor 18, is not illustrated.

The touch sensor 18 is a touch sensor of a capacitance system and includes a plurality of sensor electrodes 18x and 18y, which are arranged in a planar form inside the touch surface 3a. The sensor electrodes 18x detect a position on an X-axis. The sensor electrodes 18y detect a position on a Y-axis. The x-direction and the y-direction illustrated in FIG. 2 respectively correspond to the X-axis and the Y-axis of the Cartesian coordinate system defined on the touch surface 3a.

The sensor electrodes 18x, which are each shaped like a belt and extend in the y-direction, are arranged at equal intervals along the x-direction. The sensor electrodes 18y, which are each shaped like a belt and extend in the x-direction, are arranged at equal intervals along the y-direction. Instead of a sensor of the mutual capacitance system described above, a sensor of a self-capacitance system in which block-shaped electrodes are arranged in a two-dimensional grid pattern may be used as the touch sensor 18.

The touch IC 20 is connected to each of the plurality of sensor electrodes 18x and 18y, which constitute the touch sensor 18. The touch IC 20 includes an internal memory (a read-only memory (ROM) and a random-access memory (RAM)) and is an integrated circuit that can execute firmware 24 stored in the internal memory. A functional configuration of the touch IC 20 described later with reference to FIG. 3 is implemented by executing the firmware 24 and thereby causing each unit of the touch IC 20 to operate.

The firmware 24 executes a scan process that reads out and processes detection signals sequentially output from the sensor electrodes 18x and 18y. By executing the scan process, the firmware 24 can implement a touch detection function, which detects the touch position of the finger 4, and a pen detection function, which detects the pen position of the electronic pen 2. In other words, the touch IC 20 includes a touch detection circuit 26, which executes the touch detection function, and a pen detection circuit 28, which executes the pen detection function. The touch IC 20 outputs the data acquired by the touch detection circuit 26 or the pen detection circuit 28 to the host processor 22.

The host processor 22 is a processor including a central processing unit (CPU) or a graphics processing unit (GPU). The host processor 22 reads out and executes a program from a memory, not illustrated, to perform, for example, a process of generating stroke data by using data output from the touch IC 20 and rendering and displaying the stroke data as drawing contents on a display.

Functional Configuration of Touch IC 20

FIG. 3 is a functional block diagram illustrating the functional configuration of the touch IC 20 illustrated in FIG. 2.

Touch Detection Circuit 26

As illustrated in FIG. 3, the touch detection circuit 26 of the touch IC 20 includes a detection circuit 30, a determination circuit 32, a calculation circuit 34, and an output circuit 36.

The detection circuit 30 detects a touch of the finger 4 to the touch surface 3a by detecting the capacitive coupling generated between a tip of the finger 4 and the sensor electrodes 18x and 18y in the touch sensor 18. Specifically, the detection circuit 30 transmits a touch detection signal to each sensor electrode 18y and receives the touch detection signal at each sensor electrode 18x. Based on the reception results of the touch detection signal, the detection circuit 30 creates a heat map depicting the detection level at each two-dimensional position on the touch sensor 18.

The two-dimensional position on the touch sensor 18 is the intersection of each sensor electrode 18x and each sensor electrode 18Y. Hereinafter, the intersection is referred to as a "cross point." The detection level at each cross point corresponds to the amount of change in the capacitance value (signal value) at the cross point with respect to the capacitance value at the time of no touch detection. Specifically, the detection level at each cross point corresponds to the capacitance value (offset value) from which the capacitance value at the time of no touch detection is subtracted. In the following description, the capacitance value detected by the detection circuit 30 is assumed to be an offset value.

The detection circuit 30 detects the touch of the finger 4 when the detection level in the heat map is equal to or greater than a threshold value, that is, when the detection circuit 30 detects a region in which the capacitance values at cross points are equal to or greater than the threshold value. Hereinafter, the region in which the touch of the finger 4 to the touch surface 3a has been detected by the detection circuit 30 (the region in which the capacitance values are equal to or greater than the threshold value) is referred to as a "touch region." Based on the touch region, the detection circuit 30 detects, for example, the center position of the touch region or the position at which the capacitance value is the highest, as the touch position, and calculates the coordinates of the touch position as position information. The detection circuit 30 may calculate the center-of-gravity position of the touch region on the basis of the capacitance values at the cross points and detect the calculated center-of-gravity position as the touch position. If there are a plurality of regions in which the detection levels in the heat map are equal to or greater than the threshold value and these regions are spaced apart from each other by a predetermined distance, the detection circuit 30 may detect these individual regions as the touch regions and detect a plurality of touch positions on the basis of these touch regions. The detection circuit 30 outputs information indicating the detection results (such as the generated heat map and the coordinates of the calculated touch position) to the determination circuit 32.

The determination circuit 32 performs a determination process for determining the size of the touch region, on the basis of the heat map created by the detection circuit 30.

Figure 4:
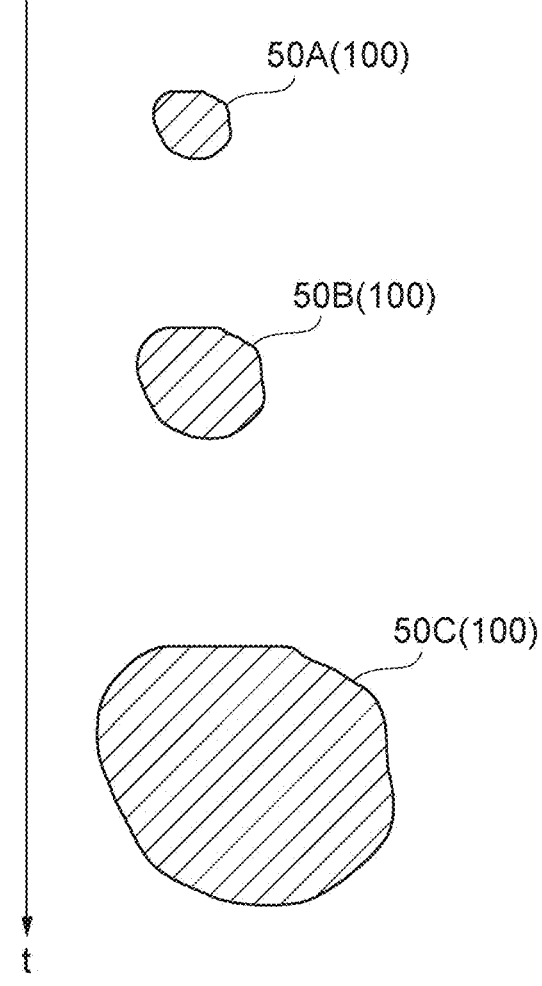
FIG. 4 is a view for describing a temporal change in the size of a touch region.

FIG. 4 is a view for describing a temporal change in the size of a touch region 100. Specifically, for example, as illustrated in FIG. 4, the area of the touch region 100 gradually increases as the user's hand slowly approaches the touch surface 3a at a speed of, for example, approximately 100 [mm/sec]. Touch regions 50A and 50B represent the touch region 100 in the initial stage in which the user's hand starts to approach the touch surface 3a. The area of the touch region 50A and the area of the touch region 50B are small and are within a reference range (predetermined range) for determining that the detected touch is a touch by the finger 4. When the size of the touch region 100 is within the reference range, the determination circuit 32 tentatively determines that the detected touch is a touch by the finger 4.

By contrast, a touch region 50C represents the touch region 100 in the stage in which the contact of the user's hand with the touch surface 3a becomes stable. The area of the touch region 50C is larger than the reference range. When the size of the touch region 100 is not within the reference range (larger than the reference range), the determination circuit 32 determines that the detected touch is a touch by a palm, such as a palm or a fist, which is larger than the finger 4.

In addition to or instead of the area of the touch region 100, the determination circuit 32 may determine the size of the touch region 100 by using the number of cross points constituting the touch region 100. For example, when the number of cross points constituting the touch region 100 is within the reference range, the determination circuit 32 tentatively determines that the detected touch is a touch by the finger 4. When the number of cross points constituting the touch region 100 is larger than the reference range, the determination circuit 32 determines that the detected touch is a touch by the palm. The determination circuit 32 outputs the determination result of the size of the touch region 100 to the calculation circuit 34 and the output circuit 36 together with the information indicating the detection result output from the detection circuit 30.

When the user's hand slowly contacts the touch surface 3a as illustrated in FIG. 4, the touch region 100 is small at the beginning of the contact. Therefore, there has been a problem with the determination based on the size of the touch region 100 that, even if the touch is not actually made by the finger 4, the touch is mistakenly determined to be a touch by the finger 4. As a result of a diligent study into this problem, the present inventors have found that the tendency of the signal distribution of the capacitance values detected by the detection circuit 30 differs between a touch by the palm and a touch by the finger 4. The findings are described with reference to FIGS. 5A and 5B.

Figure 5A:
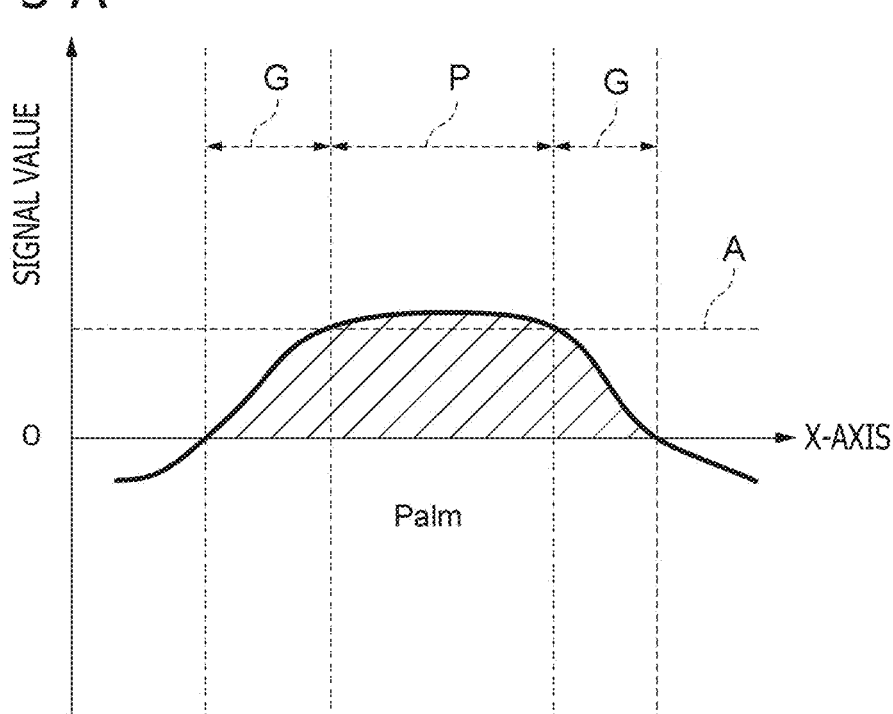
FIGS. 5A and 5B are diagrams each illustrating an example of a signal distribution detected by a detection circuit.
Figure 5B:
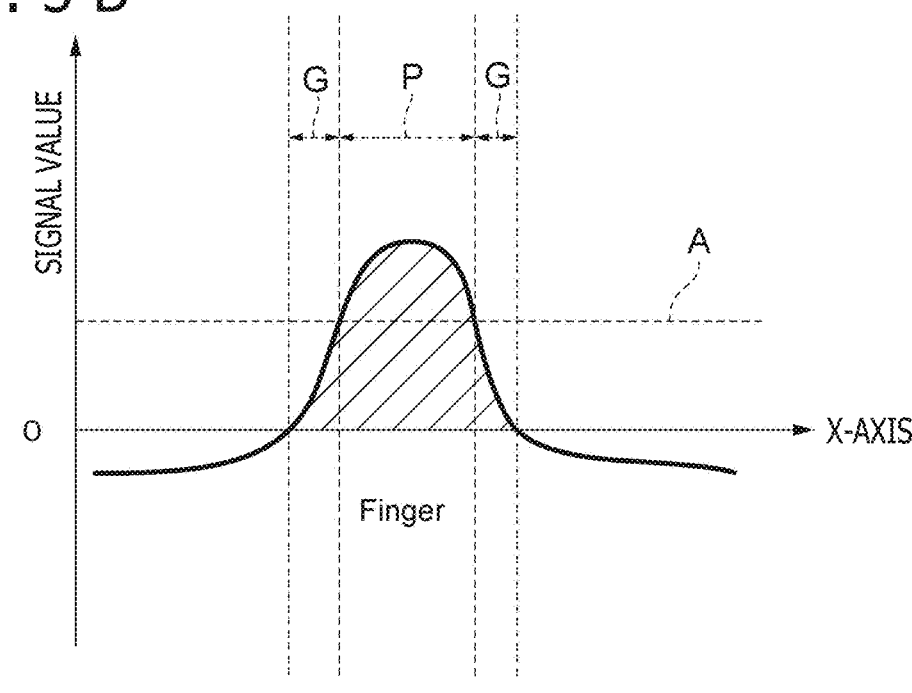

FIGS. 5A and 5B are diagrams each illustrating an example of the signal distribution detected by the detection circuit 30. A horizontal axis of FIGS. 5A and 5B indicates a detection position on the X-axis (unit: mm), and a vertical axis of FIGS. 5A and 5B indicates the capacitance value (unit: none) detected by the detection circuit 30. FIG. 5A illustrates the signal distribution in the case of a touch by the palm. FIG. 5B illustrates the signal distribution in the case of a touch by the finger 4. A peak portion P of the signal distribution illustrated in FIGS. 5A and 5B represents a region in which the capacitance values detected by the detection circuit 30 are equal to or greater than a threshold value A, that is, a portion corresponding to the touch region 100. A peripheral portion G represents a portion which is located around the peak portion P and in which the capacitance values are positive.

As illustrated in FIGS. 5A and 5B, the shape of the signal distribution has different characteristics between the touch by the palm and the touch by the finger 4. That is, the area of the region (region indicated by a shaded line) between the peak portion P and the peripheral portion G and the X-axis is different between the touch by the palm and the touch by the finger 4. Specifically, the area of the region (region indicated by the shaded line) between the peak portion P and the peripheral portion G and the X-axis in the case of the touch by the palm illustrated in FIG. 5A is greater than the area of the region (region indicated by the shaded line) between the peak portion P and the peripheral portion G and the X-axis in the case of the touch by the finger 4 illustrated in FIG. 5B. This area corresponds to a total value obtained by adding the capacitance values in the peak portion P and the peripheral portion G.

Based on this, the present inventors have found that the total value obtained by adding, by a predetermined method, the capacitance values detected by the detection circuit 30 is different between the palm and the finger 4. The predetermined method is, for example, to add the capacitance values in a calculation region surrounding at least part of the touch region 100. The term "surrounding" indicates surrounding part or all of the boundary line of the touch region 100. The calculation region may be a peripheral region (surrounding region) of the touch region 100 that excludes the touch region 100 or may be a region that includes at least part of the touch region 100 in addition to this peripheral region. The present inventors have also found that the difference in the tendency of the distribution of the above-described total value becomes clearer when the calculation region is a peripheral region of the touch region 100, and even clearer when positive capacitance values, excluding negative capacitance values, in the peripheral region are added. The findings are described with reference to FIG. 6.

Figure 6:
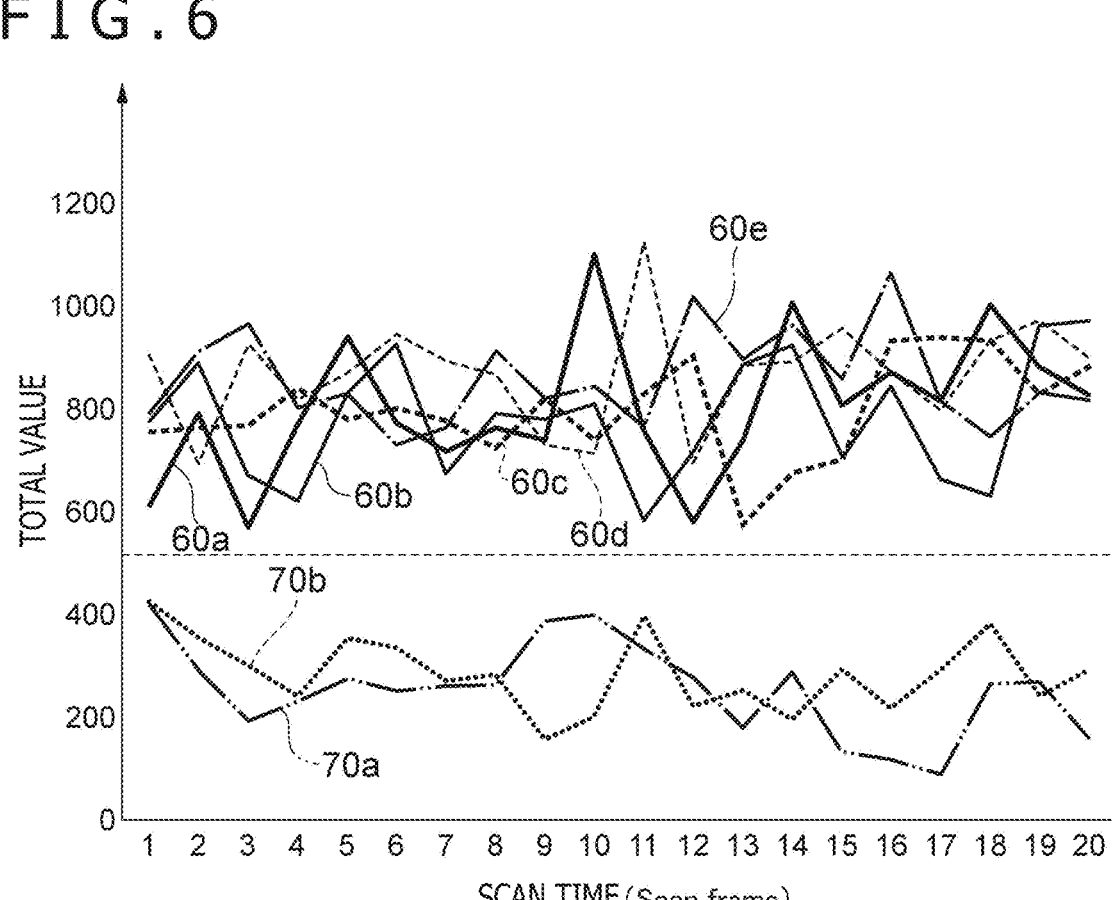
FIG. 6 is a diagram illustrating an example of the distribution of the total values each obtained by adding positive capacitance values in a peripheral region of a touch region.

FIG. 6 is a diagram illustrating an example of the distribution of the total values each obtained by adding positive capacitance values in the peripheral region of the touch region 100. A horizontal axis of FIG. 6 indicates the elapsed scan time (unit: sec), and a vertical axis of FIG. 6 indicates the total value (unit: none) obtained by adding positive capacitance values in the peripheral region of the touch region 100. Hereinafter, the total value is also simply referred to as "the total value of the capacitance values."

Graphs 60a to 60e depict the distribution in the case of a touch by the palm. Specifically, the graphs 60a to 60e depict the distribution when the palm approaches the touch surface 3a at a speed of 2 [mm/s], 4 [mm/s], 6 [mm/s], 8 [mm/s], and 10 [mm/s], respectively. Graphs 70a and 70b depict the distribution in the case of a touch by the finger 4. Specifically, the graph 70a depicts the distribution in the case of a touch to the touch surface 3a by the finger 4, which is an actual finger. The graph 70b depicts the distribution in the case of a touch to the touch surface 3a by a finger jig, which imitates the finger 4.

As illustrated in FIG. 6, the graphs 60a to 60e are positioned above a predetermined threshold value TH. That is, in the case of a touch by the palm, the total value of the capacitance values is larger than the threshold value TH. By contrast, the graphs 70a and 70b are positioned below the threshold value TH. That is, in the case of a touch by the finger 4, the total value of the capacitance values is smaller than the threshold value TH. From these graphs, it can be understood that the tendency of the distribution of the total values of the capacitance values differs depending on whether the touch has been made by the palm or the finger 4.

Based on the findings, when the size of the touch region 100 is within the reference range, the determination circuit 32 determines whether the touch has been made by the palm or the finger 4, on the basis of the capacitance values, which are the electrical index, instead of the size of the touch region 100. Specifically, the determination circuit 32 makes the determination based on the result calculated by the calculation circuit 34 as the total value of the capacitance values. When the total value of the capacitance values calculated by the calculation circuit 34 is equal to or less than the threshold value TH, the determination circuit 32 determines that the touch has been made by the finger 4. On the other hand, when the total value exceeds the threshold value TH, the determination circuit 32 determines that the touch has been made by the palm. The threshold value TH is set appropriately on the basis of, for example, the performance of the electronic device 3. The determination circuit 32 outputs the touch determination result based on the total value of the capacitance values to the output circuit 36.

The calculation circuit 34 calculates the total value of the capacitance values in the calculation region (i.e., the peripheral region of the touch region 100), which surrounds at least part of the touch region 100 and excludes the touch region 100. For example, when the determination circuit 32 determines that the size of the touch region 100 is within the reference range, the calculation circuit 34 calculates the total value.

Figure 7:
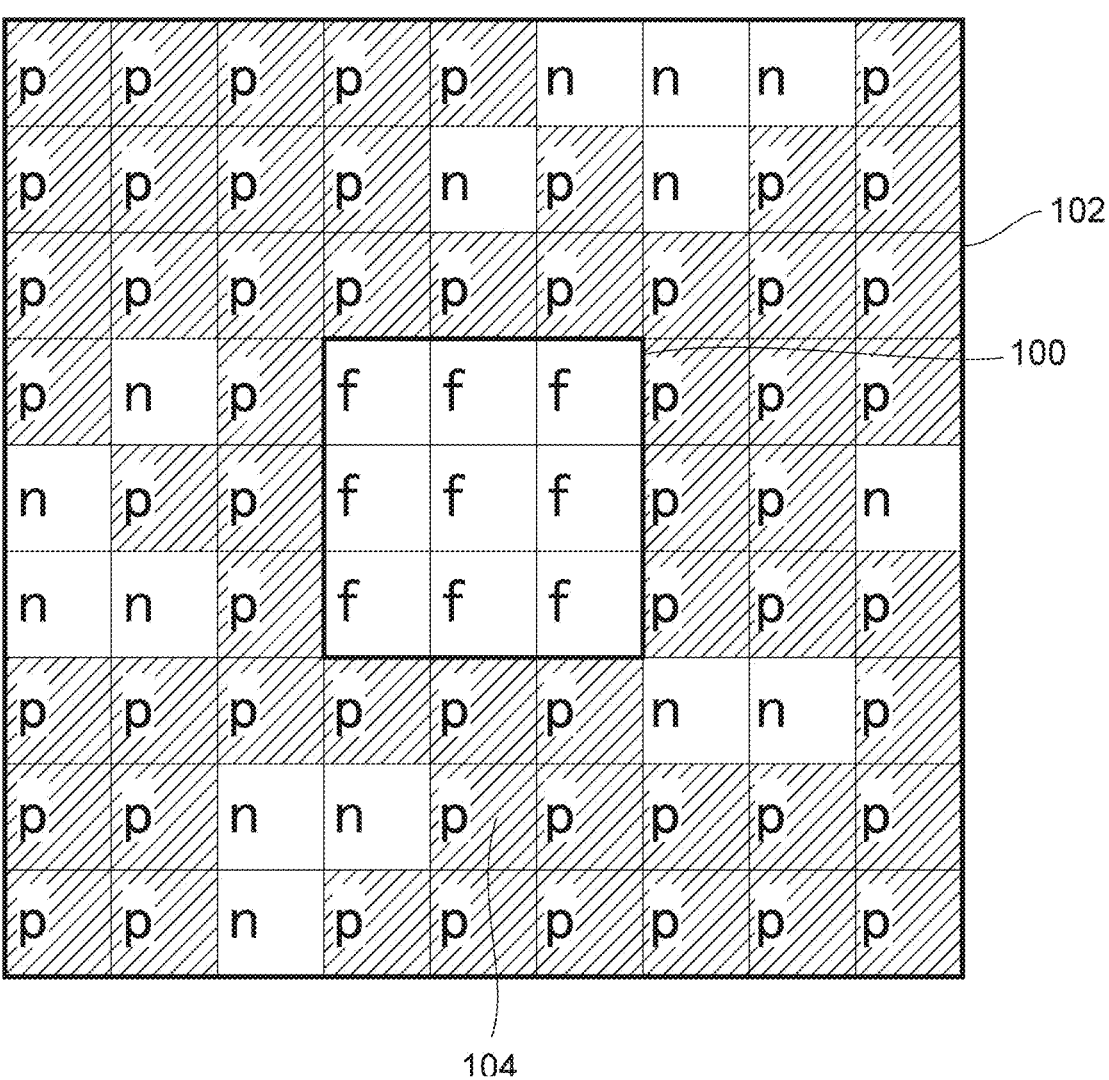
FIG. 7 is a diagram for describing a method for calculating a total value of capacitance values.

FIG. 7 is a diagram for describing a method for calculating the total value of the capacitance values. In FIG. 7, the cross points in a predetermined region surrounding the touch region 100 are depicted as 81 cells (squares) of 9 cells in height×9 cells in width. The capacitance value at each cross point is indicated by "f," "p," or "n" stored in the cell. "f" indicates that the capacitance value at the cross point is equal to or greater than the threshold value A used by the detection circuit 30 to detect a touch by the finger 4. In other words, the touch region 100 is indicated by the region indicated by 9 cells of 3 cells in height×3 cells in width where "f" is stored. "p" indicates that the capacitance value at the cross point is less than the threshold value A used by the detection circuit 30 to detect a touch by the finger 4 and is a positive value. "n" indicates that the capacitance value at the cross point is a negative value.

First, for example, as illustrated in FIG. 7, the calculation circuit 34 sets an extended region 102, which surrounds the entire boundary line of the touch region 100. The extended region 102 is a region extended from the touch region 100 by predetermined cross points. In the example illustrated in FIG. 7, the extended region 102 is a region extended from the touch region 100 by 3 points in each of the four directions. The extent to which the extended region 102 is extended from the touch region 100 can be appropriately set on the basis of, for example, the performance of the electronic device 3.

Next, the calculation circuit 34 sets a ring-shaped peripheral region 104, which excludes the touch region 100 from the extended region 102, as the calculation region. The peripheral region 104 is a region delimited by the boundary line of the extended region 102 and the boundary line of the touch region 100. An outer boundary line of the peripheral region 104 corresponds to the boundary line of the extended region 102, and an inner boundary line of the peripheral region 104 corresponds to the boundary line of the touch region 100. The calculation circuit 34 calculates the total value of the positive capacitance values in the peripheral region 104. That is, the calculation circuit 34 calculates the total value of the capacitance values in the region of the positive capacitance values (hatched region in FIG. 7), excluding the negative capacitance values, in the peripheral region 104. The calculation circuit 34 outputs the calculated result to the determination circuit 32.

The output circuit 36 outputs the touch position of the touch detected by the detection circuit to the host processor 22, on the basis of the determination result of the size of the touch region 100 by the determination circuit 32. Outputting the touch position means outputting the information regarding the touch position, for example, outputting the coordinates of the touch position calculated by the detection circuit 30. The information regarding the touch position is not limited to the position information such as the coordinates and may also include, for example, information such as a pressure applied at the touch position.

When the size of the touch region 100 is not within the reference range and the touch is determined to be a touch by the palm, the output circuit 36 does not output the touch position to the host processor 22 or invalidates the touch position and outputs the touch position that has been invalidated. Invalidating the touch position and outputting the touch position that has been invalidated means invalidating the touch position and outputting the touch position that has been invalidated to the host processor 22, in order for drawing or other processing not to be performed by the host processor 22 on the basis of the touch position. A specific example of the method for invalidating the touch position and outputting the touch position that has been invalidated includes outputting a flag indicating "invalidated" to the host processor 22 together with the touch position. In this way, when the touch is determined to be a touch by the palm on the basis of the size of the touch region 100, the touch position is not output or is invalidated, so that drawing or other processing based on the touch position is not performed by the host processor 22.

When the size of the touch region 100 is within the reference range, the output circuit 36 outputs the touch position detected by the detection circuit 30 to the host processor 22, on the basis of the total value of the capacitance values calculated by the calculation circuit 34.

Specifically, when the total value is equal to or less than the threshold value TH, that is, when the determination circuit 32 determines that the total value is equal to or less than the threshold value TH and therefore determines that the touch has been made by the finger 4, the output circuit 36 outputs the touch position to the host processor 22. On the other hand, when the total value exceeds the threshold value TH, that is, when the determination circuit 32 determines that the total value exceeds the threshold value TH and therefore determines that the touch has been made by the palm, the output circuit 36 does not output the touch position or invalidates the touch position and outputs the touch position that has been invalidated. In this way, even when the touch is tentatively determined to be a touch by the finger 4 on the basis of the size of the touch region 100 but the touch is determined to be a touch by the palm on the basis of the total value of the capacitance values, the touch position is not output or is invalidated, so that drawing or other processing based on the touch position is not performed by the host processor 22.

Pen Detection Circuit 28

Referring back to FIG. 3, the pen detection circuit 28 of the touch IC 20 includes a detection circuit 38, a determination circuit 40, and an output circuit 42.

The detection circuit 38 detects the electronic pen 2 by transmitting the uplink signal to the electronic pen 2 and receiving the downlink signal transmitted from the electronic pen 2 that has received the uplink signal. The uplink signal is a signal used to synchronize the electronic pen 2 with the electronic device 3 and to transmit a command indicating the contents of data to be transmitted to the electronic pen 2. The downlink signal includes an unmodulated burst signal and a data signal, which is modulated by various kinds of data acquired in the electronic pen 2, in this order. Various kinds of data acquired in the electronic pen 2 are data acquired by each functional unit of the electronic pen 2 described above. These various kinds of data may include, for example, data (pen pressure value) indicating a pen pressure detected by the pen pressure detector, data (switch data) indicating the on/off state of the side switch acquired by the side switch state detector, and a unique pen ID stored in the storage device.

Specifically, the detection circuit 38 performs a process of transmitting the uplink signal to the electronic pen 2, by generating the uplink signal and inputting the uplink signal into each of the sensor electrodes 18x and 18y. Next, the detection circuit 38 receives the downlink signal transmitted from the electronic pen 2 in response to the electronic pen 2 receiving the uplink signal. The detection circuit 38 detects the downlink signal as the result of a global scan or a sector scan. The global scan means scanning all the sensor electrodes 18x and 18y constituting the touch sensor 18. The sector scan means scanning only a predetermined number of sensor electrodes 18x and 18y that are located in the vicinity of the previous pen position among the plurality of sensor electrodes 18x and 18y constituting the touch sensor 18.

When the downlink signal is not detected, the detection circuit 38 outputs pen data indicating no pen detection to the output circuit 42. When the downlink signal is detected, the detection circuit 38 calculates the coordinates of the pen position on the basis of the downlink signal. Then, the detection circuit 38 outputs information indicating the calculated pen coordinates to the output circuit 42. The detection circuit 38 also detects the pen state of the electronic pen 2 on the basis of the downlink signal. For example, the detection circuit 38 detects the pen pressure of the electronic pen 2 by demodulating the data signal included in the downlink signal. The detection circuit 38 may also detect, for example, the speed, acceleration, and pen tilt of the electronic pen 2 as the pen state. The detection circuit 38 outputs the information indicating the detected pen state to the determination circuit 40 and the output circuit 42.

The determination circuit 40 determines the operation state of the electronic pen 2 on the basis of various kinds of data transmitted from the electronic pen 2. The operation state includes, for example, pen down, pen move, pen up, and hovering. "Pen down" indicates that the pen tip of the electronic pen 2 is placed on the touch surface 3*a*, that is, the electronic pen 2 is brought into contact with the touch surface 3*a*. "Pen move" indicates that the electronic pen 2 in contact with the touch surface 3*a* continues to be in contact with the touch surface 3*a*. "Pen up" indicates that the electronic pen 2 in contact with the touch surface 3*a* has left the touch surface 3*a*. "Hovering" indicates that the electronic pen 2 is away from the touch surface 3*a*. The determination circuit 40 determines the operation state of the electronic pen 2 on the basis of whether or not the pen pressure value of the electronic pen 2 is equal to or greater than a threshold value. The operation state is used by the host processor 22 to recognize the start and end of a stroke.

For example, when the pen pressure value changes from a value greater than 0 to 0, the determination circuit 40 determines the operation state as "pen up." For example, not only when the pen pressure value changes to 0 but also when the pen pressure value changes to a value equal to or less than the threshold value close to 0, the determination circuit 40 may determine the operation state as "pen up." When the pen pressure value changes to a value equal to or less than the threshold value close to 0, the electronic pen 2 is about to leave the touch surface 3*a*. Even when the electronic pen 2 has not completely left the touch surface 3*a*, the electronic pen 2 may be considered to have left the touch surface 3*a*. Further, when the pen pressure value changes from 0 to a value greater than 0, the determination circuit 40 determines the operation state as "pen down." In addition, when the pen pressure value continues to maintain a value greater than 0, the determination circuit 40 determines the operation state as "pen move." Moreover, when the pen pressure value continues to detect 0, the determination circuit 40 determines the operation state as "hovering." The determination circuit 40 outputs the determination result of the operation state of the electronic pen 2 to the output circuit 42.

When no pen signal is detected by the detection circuit 38, the output circuit 42 transmits pen data indicating no pen detection to the host processor 22. When the pen signal is detected by the detection circuit 38, the output circuit 42 transmits, to the host processor 22, information indicating the pen coordinates derived by the detection circuit 38. Further, the output circuit 42 transmits, for example, information indicating the pen state of the electronic pen 2 and information indicating the operation state of the electronic pen 2 to the host processor 22.

Operation of Position Detection System 1

Figure 8:
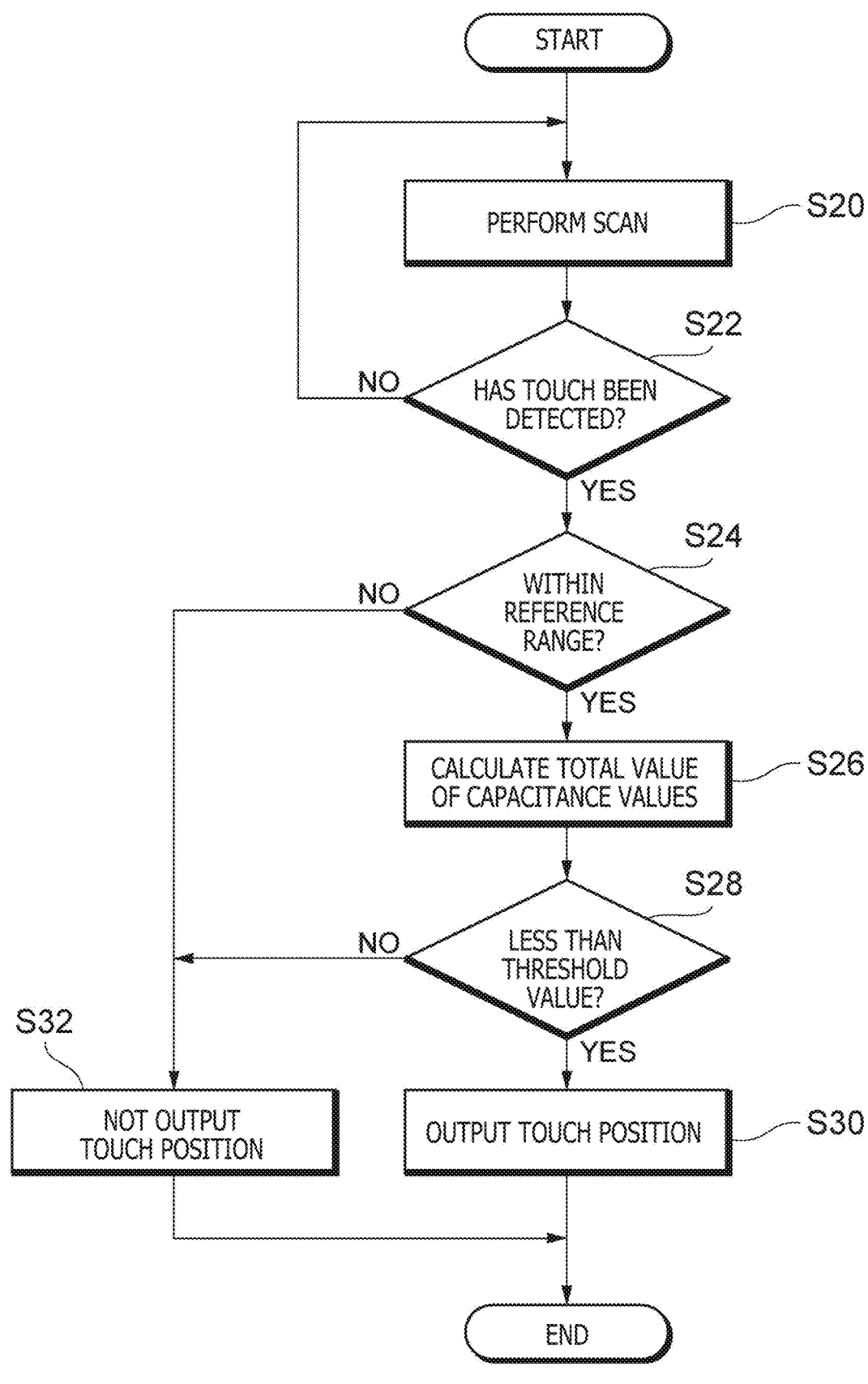
FIG. 8 is a flowchart illustrating an example of a flow of a process of detecting a touch of a finger in the position detection system of FIG. 1.

Next, a flow of a process of detecting a touch of the finger 4 in the position detection system 1 is described with reference to FIG. 8. FIG. 8 is a flowchart illustrating an example of the flow of the process of detecting a touch of the finger 4 in the position detection system 1.

Step S20

First, the firmware 24 of the touch IC 20 performs the scan process. In this process, for example, the firmware 24 controls the operation such that the detection of a touch of the finger 4 by the detection circuit 30 of the touch detection circuit 26 and the detection of the electronic pen 2 by the detection circuit 38 of the pen detection circuit 28 are alternately performed in a time-divisional manner. The execution frequency of the detection of a touch of the finger 4 and the execution frequency of the detection of the electronic pen 2 are set in advance to be a predetermined ratio. The processing then proceeds to step S22.

Step S22

The detection circuit 30 determines whether or not a touch of the finger 4 has been detected, that is, whether or not the touch region 100 in which the capacitance values at the cross points are equal to or greater than the threshold value A has been detected. When the determination result is affirmative, the processing proceeds to step S24. When the determination result is negative, the processing returns to step S20.

Step S24

The determination circuit 32 determines whether or not the touch region 100 detected in the process in step S22 is within the reference range. When the determination result is affirmative, the processing proceeds to step S26. When the determination result is negative, the processing proceeds to step S32.

Step S26

The calculation circuit 34 calculates the total value of the positive capacitance values in the peripheral region 104 of the touch region 100 whose determination result has been affirmative in the process in step S24.

Figures 9A, 9B:
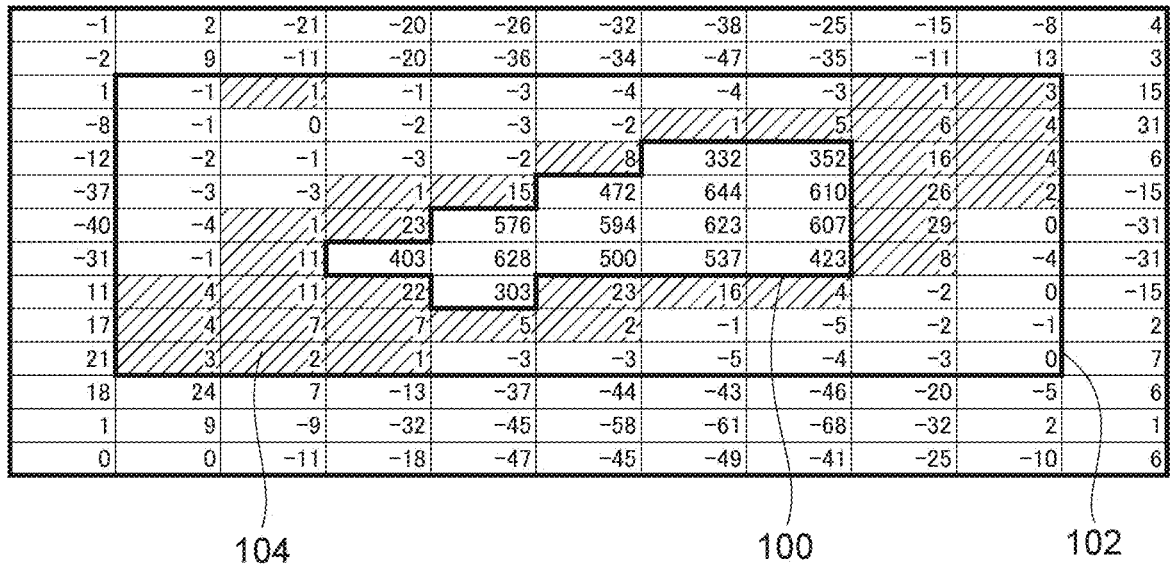
FIGS. 9A and 9B are diagrams for describing specific examples of the calculation of a total value of capacitance values by a calculation circuit.

FIGS. 9A and 9B are diagrams for describing specific examples of the calculation of the total value of the capacitance values by the calculation circuit 34. Specifically, FIGS. 9A and 9B illustrate specific numerical examples of the capacitance values in the periphery of the touch region 100. The calculation circuit 34 adds the positive capacitance values in the peripheral region 104, that is, the capacitance values in the hatched regions illustrated in FIGS. 9A and 9B. As a result, in the case of FIG. 9A, the total value of the capacitance values is calculated as 2734. By contrast, in the case of FIG. 9B, the total value of the capacitance values is calculated as 276. After that, the processing proceeds to step S28.

Step S28

The determination circuit 32 determines whether or not the total value is equal to or less than the threshold value TH, on the basis of the total value calculated in the process in step S26. The threshold value TH is, for example, set to 1000. In the case of FIG. 9A, since the total value of the capacitance values is 2734, which exceeds the threshold value TH of 1000, the determination result is negative, and the touch is determined to be a touch by the palm. The processing then proceeds to step S32. By contrast, in the case of FIG. 9B, since the total value of the capacitance values is 276, which is less than the threshold value TH of 1000, the determination result is affirmative, and the touch is determined to be a touch by the finger 4. Then, the processing proceeds to step S30. When the touch region 100 within the reference range has the same size as in the cases of FIG. 9A and FIG. 9B, the touch in both cases is determined to be a touch by the finger 4 with the area-based determination of the related art. By contrast, in the process in step S28, it is possible to appropriately determine whether the touch has been made by the palm or the finger 4 with the determination based on the total value of the capacitance values.

Step S30

The output circuit 36 outputs the touch position, which indicates the position indicated by the touch detected by the process in step S22, to the host processor 22.

Step S32

The output circuit 36 does not output the touch position, which indicates the position indicated by the touch detected by the process in step S22, to the host processor 22 or invalidates the touch position and outputs the touch position that has been invalidated to the host processor 22. The series of processes illustrated in FIG. 8 ends.

Advantageous Effects

The touch IC 20, which is included in the position detection system 1 according to the present embodiment, detects, by using the touch sensor 18, the touch position that is the position indicated by the finger 4 to the touch surface 3a disposed on the touch sensor 18. The touch IC 20 includes the detection circuit 30, which detects a touch of the finger 4 to the touch surface 3a, the calculation circuit 34, which calculates the total value of the capacitance values in the calculation region surrounding at least part of the touch region 100, and the output circuit 36, which outputs the touch position on the basis of the total value of the capacitance values calculated by the calculation circuit 34. When the total value calculated by the calculation circuit 34 is equal to or less than the threshold value TH, the output circuit 36 outputs the touch position. When the total value exceeds the threshold value TH, the output circuit 36 does not output the touch position or invalidates the touch position and outputs the touch position that has been invalidated.

A position detection method according to the present embodiment is performed by the touch IC 20 and includes a detection step of detecting a touch of the finger 4 to the touch surface 3a (step S22), a calculation step of calculating the total value of the capacitance values in the calculation region surrounding at least part of the touch region 100 (step S26), and an output step of outputting the touch position on the basis of the total value of the capacitance values calculated in the calculation step (steps S30 and S32). The output step includes outputting the touch position (step S30) when the total value calculated in the calculation step is equal to or less than the threshold value TH, and not outputting the touch position or invalidating the touch position and outputting the touch position that has been invalidated (step S32) when the total value exceeds the threshold value TH.

With the position detection system 1, the touch IC 20, and the position detection method according to the present embodiment, the touch position is output on the basis of the total value of the capacitance values in the calculation region surrounding at least part of the touch region 100. As described above, the total value of the capacitance values in the calculation region exhibits a different tendency depending on whether the touch has been made by the palm or the finger 4. Therefore, even in a situation in which whether the touch has been made by the palm or the finger 4 cannot be appropriately determined by the determination based on the size of the touch region 100, when the total value is equal to or less than the threshold value TH, the touch is determined to be a touch by the finger 4 and the touch position is output, while, when the total value exceeds the threshold value TH, the touch is determined to be a touch by the palm and the touch position is not output or is invalidated and output. As a result, the host processor 22 can properly perform processing such as drawing based on the touch position, and it is possible to suppress the situation in which the operation result becomes the one that is not intended by the user.

Further, in the present embodiment, the calculation circuit 34 calculates the total value of the capacitance values in the peripheral region 104, which is the calculation region surrounding at least part of the touch region 100 and excluding the touch region 100.

As described above, the difference in the tendency of the total value of the capacitance values between the palm and the finger 4 becomes clearer in the peripheral region 104. Therefore, according to the present embodiment, since the touch position is output on the basis of the total value of the capacitance values in the peripheral region 104, it is possible to more accurately suppress the situation in which the operation result becomes the one that is not intended by the user.

Further, in the present embodiment, the calculation circuit 34 calculates the total value of the positive capacitance values among the capacitance values in the peripheral region 104.

As described above, the difference in the tendency of the total value of the capacitance values between the palm and the finger 4 becomes clearer in the total value of the positive capacitance values, excluding the negative capacitance values, among the capacitance values in the peripheral region 104. Therefore, according to the present embodiment, since the touch position is output on the basis of the total value of the positive capacitance values, it is possible to more accurately suppress the situation in which the operation result becomes the one that is not intended by the user.

Further, in the present embodiment, the calculation circuit 34 calculates the total value of the capacitance values in the calculation region when the size of the touch region 100 is within the reference range (predetermined range). The output circuit 36 outputs the touch position on the basis of the total value when the size of the touch region 100 is within the reference range.

For example, assume the case where a hand slowly approaches the touch surface 3a. In this case, the touch region 100 is small at the beginning of the contact, and as the contact becomes stable, the touch region 100 gradually becomes larger. In such a case, with the determination based on the size of the touch region 100, as in the related art, the touch is mistakenly determined to be a touch by the finger 4 at the beginning of the contact. Thus, it is difficult to determine at an early stage whether the touch has been made by the palm or the finger 4. By contrast, according to the present embodiment, the touch position is output on the basis of the total value of the capacitance values. Therefore, it is possible to determine at an early stage whether or not to output the touch position (or whether to invalidate the touch position and output the touch position that has been invalidated).

Modifications

The present disclosure is not limited to the embodiment described above. That is, design modifications made to the above-described embodiment by those skilled in the art as appropriate also fall within the scope of the present disclosure as long as the modifications have the features of the present disclosure. In addition, the elements included in the embodiment described above and modifications to be described later can be combined as long as such combinations are technically possible, and such combinations also fall within the scope of the present disclosure as long as the combinations have the features of the present disclosure.

For example, not only when the size of the touch region 100 is within the reference range, but also when the size of the touch region 100 is not within the reference range, the calculation circuit 34 may calculate the total value of the capacitance values and the output circuit 36 may output the touch position on the basis of the total value. The method for calculating the total value of the capacitance values by the calculation circuit 34 is not limited to the example described above. For example, the calculation circuit 34 may calculate the total value of both the positive and negative capacitance values in the peripheral region 104. Further, the calculation circuit 34 may calculate the total value in a calculation region including part or all of the touch region 100 in addition to the peripheral region 104. In this case, the calculation circuit 34 may calculate the total value of the positive capacitance values only or calculate the total value of both the positive and negative capacitance values. Regardless of which of these calculation methods is employed, the output circuit 36 outputs the touch position on the basis of the calculated total value of the capacitance values as with the embodiment described above. Therefore, similar effects to those described above can be obtained.

Further, the determination circuit 32 may use not only one reference range but also a plurality of reference ranges as the reference range for determining the size of the touch region 100. For example, the determination circuit 32 may use a first range, which is indicated by a lower limit value and an upper limit value for determining that the touch has been made by the finger 4, and a second range, which is indicated by a lower limit value and an upper limit value for determining that the touch has been made by the palm. The size of the touch region 100 may be determined on the basis of, for example, conditions such as the length in the X- and Y-directions, without limiting to the area and the number of cross points described above.

Further, as illustrated in FIGS. 5A and 5B, the degree of the inclination in the periphery of the peak portion P in the signal distribution differs between the touch by the palm and the touch by the finger 4. Specifically, as illustrated in FIG. 5A, in the case of the touch by the palm, the gradient of the signal distribution is gradual in the peripheral portion G. By contrast, as illustrated in FIG. 5B, in the case of the touch by the finger 4, the gradient of the signal distribution is steep in the peripheral portion G. Based on this, the output circuit 36 may output the touch position, on the basis of the gradient of the peripheral portion G in the signal distribution of the capacitance values detected by the detection circuit 30, in addition to or instead of the total value of the capacitance values calculated by the calculation circuit 34. In this case, specifically, when the gradient of the peripheral portion G is steeper than a predetermined reference, the touch position is output as the touch by the finger 4. When the gradient of the peripheral portion G is more gradual than the predetermined reference, the touch is determined to be a touch by the palm and thus the touch position is not output or is invalidated and output. Note that, compared to the case where the touch position is output on the basis of the gradient of the peripheral portion G, when the total value of the capacitance values is calculated as in the embodiment described above, it is possible to obtain an effect that a physical quantity correlated with the gradient of the peripheral portion G can be calculated with a simpler calculation.

Further, although the capacitance values are described as the signal values (unit: none) detected by the detection circuit 30 in the embodiment described above, the capacitance values may be actual measurement values of the capacitances (unit: μF) actually measured on the basis of the signal values. In other words, the calculation circuit 34 may calculate the total value of the actual measurement values of the capacitances in addition to or instead of the signal values, and the output circuit 36 may output the touch position on the basis of the total value of the actual measurement values of the capacitances in addition to or instead of the total value of the signal values.

It is to be noted that the embodiment of the present disclosure is not limited to the foregoing embodiment, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A position detection circuit for detecting, by using a touch sensor of a mutual capacitance system, a position indicated by a passive pointer to a touch surface disposed on the touch sensor, the touch sensor including a plurality of first sensor electrodes and a plurality of second sensor electrodes, the first sensor electrodes intersecting the second sensor electrodes at a plurality of cross points, the position detection circuit comprising:

a detection circuit which, in operation, detects a touch region of the touch surface, wherein a capacitance value at each of the cross points in the touch region is greater than or equal to a threshold value;

a calculation circuit which, in operation, calculates a total value of a plurality of capacitance values at each of the cross points in a calculation region surrounding at least part of the touch region by adding the capacitance values at each of the cross points in the calculation region surrounding at least part of the touch region; and an output circuit which, in operation, outputs an indicated position that is indicated by a touch in the touch region detected by the detection circuit, based on the total value of the plurality of capacitance values at each of the cross points in the calculation region surrounding at least part of the touch region calculated by adding the capacitance values at each of the cross points in the calculation region surrounding at least part of the touch region, wherein the output circuit, in operation, outputs the indicated position when the total value of the plurality of capacitance values calculated by adding the capacitance values at each of the cross points in the calculation region surrounding at least part of the touch is equal to or less than a threshold value, and does not output the indicated position or invalidates the indicated position and outputs the indicated position that has been invalidated, when the total value of the plurality of capacitance values calculated by adding the capacitance values at each of the cross points in the calculation region surrounding at least part of the touch exceeds the threshold value.

2. The position detection circuit according to claim 1, wherein the calculation circuit, in operation, calculates a total value of capacitance values at each of the cross points in the calculation region surrounding at least part of the touch region and excluding the touch region.

3. The position detection circuit according to claim 1, wherein the calculation circuit, in operation, calculates a total value of positive capacitance values among the capacitance values in the calculation region.

4. The position detection circuit according to claim 1,
wherein the calculation circuit, in operation, calculates the total value of the capacitance values at each of the cross points in the calculation region when a size of the touch region is within a predetermined range, and
wherein the output circuit, in operation, outputs the indicated position based on the total value when the size of the touch region is within the predetermined range.

5. The position detection circuit according to claim 1, wherein the detection circuit, in operation, detects as the indicated position a position corresponding to a cross point in the touch region at which the capacitance value is highest.

6. The position detection circuit according to claim 1, wherein the detection circuit, in operation, calculates a center-of-gravity position of the touch region based on the capacitance value at each of the cross points in the touch region, and detects as the indicated position the center-of-gravity position.

7. The position detection circuit according to claim 1, wherein the detection circuit, in operation, transmits a first touch detection signal to each of the first sensor electrodes, receives a second touch detection signal from each of the second sensor electrodes, and creates a heat map depicting a detection level at each of the cross points of the first sensor electrodes and the second sensor electrodes.

8. A position detection method for detecting, by using a touch sensor of a mutual capacitance system, a position indicated by a passive pointer to a touch surface disposed on the touch sensor, the touch sensor including a plurality of first sensor electrodes and a plurality of second sensor electrodes, the first sensor electrodes intersecting the second sensor electrodes at a plurality of cross points, the position detection method being performed by a position detection circuit connected to the touch sensor, the position detection method comprising:
detecting a touch region of the touch surface, wherein a capacitance value at each of the cross points in the touch region is greater than or equal to a threshold value;
calculating a total value of a plurality of capacitance values at each of the cross points in a calculation region surrounding at least part of the touch region by adding the capacitance values at each of the cross points in the calculation region surrounding at least part of the touch region; and
outputting an indicated position that is indicated by a touch in the touch region detected in the detecting, based on the total value of the plurality of capacitance values calculated adding the capacitance values at each of the cross points in the calculation region surrounding at least part of the touch region,
wherein the outputting includes outputting the indicated position when the total value of the plurality of capacitance values calculated by adding the capacitance values at each of the cross points in the calculation region surrounding at least part of the touch is equal to or less than a threshold value, and not outputting the indicated position or invalidating the indicated position and outputting the indicated position that has been invalidated, when the total value of the plurality of capacitance values calculated by adding the capacitance values at each of the cross points in the calculation region surrounding at least part of the touch exceeds the threshold value.

9. The position detection method according to claim 8, the calculating includes calculating a total value of capacitance values at each of the cross points in the calculation region surrounding at least part of the touch region and excluding the touch region.

10. The position detection method according to claim 8, wherein the calculating includes calculating a total value of positive capacitance values among the capacitance values in the calculation region.

11. The position detection method according to claim 8,
wherein the calculating includes calculating the total value of the capacitance values in the calculation region when a size of the touch region is within a predetermined range, and
wherein the outputting includes outputting the indicated position based on the total value when the size of the touch region is within the predetermined range.

12. The position detection method according to claim 8, further comprising:
detecting as the indicated position a position corresponding to a cross point in the touch region at which the capacitance value is highest.

13. The position detection method according to claim 8, further comprising:
calculating a center-of-gravity position of the touch region based on the capacitance value at each of the cross points in the touch region; and
detecting as the indicated position the center-of-gravity position.

14. The position detection method according to claim 8, further comprising:
transmitting a first touch detection signal to each of the first sensor electrodes;
receiving a second touch detection signal from each of the second sensor electrodes, and
creating a heat map depicting a detection level at each of the cross points of the first sensor electrodes and the second sensor electrodes.

* * * * *